United States Patent
Morotti et al.

(10) Patent No.: US 6,921,110 B2
(45) Date of Patent: Jul. 26, 2005

(54) THREADED JOINT FOR TUBES

(75) Inventors: Matteo Morotti, Bergamo (IT); Diego Dell'Erba, Campana (AR); Giuseppe Della Pina, Treviolo (IT)

(73) Assignee: Tenaris Connections A.G., Schaan (LI)

( * ) Notice: Subject to any disclaimer, the term of this patent is extended or adjusted under 35 U.S.C. 154(b) by 0 days.

(21) Appl. No.: 10/774,420

(22) Filed: Feb. 10, 2004

(65) Prior Publication Data

US 2004/0183297 A1 Sep. 23, 2004

(30) Foreign Application Priority Data

Feb. 13, 2003 (IT) ..................... RM2003A0065

(51) Int. Cl.$^7$ ................................. F16L 15/04
(52) U.S. Cl. ..................... 285/94; 285/333; 285/390
(58) Field of Search ............. 285/94, 333, 334, 285/390

(56) References Cited

U.S. PATENT DOCUMENTS

| | | | |
|---|---|---|---|
| 3,109,672 A | | 11/1963 | Franz |
| 3,831,259 A | * | 8/1974 | Goulas .................. 29/428 |
| 4,256,811 A | | 3/1981 | Black .................... 428/562 |
| 4,414,247 A | | 11/1983 | Hübecker et al. ........... 427/230 |
| 4,630,849 A | | 12/1986 | Fukui et al. ............... 285/55 |
| 4,692,988 A | | 9/1987 | Shulver et al. ............. 29/458 |
| 4,830,411 A | | 5/1989 | Tsuru et al. ............... 285/334 |
| 5,252,902 A | * | 10/1993 | Uehara et al. ............. 318/599 |
| 5,407,590 A | | 4/1995 | Salvia ................... 252/12 |
| 5,519,111 A | | 5/1996 | MacDiarmid et al. ........ 528/422 |
| 5,567,355 A | | 10/1996 | Wessling et al. ........... 252/500 |
| 5,980,723 A | | 11/1999 | Runge-Marchese et al. 205/316 |
| 6,027,145 A | | 2/2000 | Tsuru et al. .............. 285/94 |
| 6,500,544 B1 | | 12/2002 | Tiitu et al. ............... 428/413 |
| 6,581,980 B1 | * | 6/2003 | DeLange et al. ........... 285/334 |
| 6,679,526 B2 | | 1/2004 | Yamamoto et al. .......... 285/55 |
| 2002/0114940 A1 | | 8/2002 | Clemens et al. ........... 428/318.4 |
| 2002/0166770 A1 | | 11/2002 | Kimpel et al. ............. 204/478 |
| 2002/0197468 A1 | | 12/2002 | Sinko .................... 428/336 |
| 2003/0111838 A1 | * | 6/2003 | Goto et al. ............... 285/94 |
| 2003/0144158 A1 | | 7/2003 | Petelot .................. 508/318 |
| 2003/0159764 A1 | * | 8/2003 | Goto .................... 148/519 |
| 2004/0113423 A1 | * | 6/2004 | Dell'Erba et al. .......... 285/55 |

FOREIGN PATENT DOCUMENTS

| | | | |
|---|---|---|---|
| AU | 520538 B | 2/1982 | |
| CN | 1218100 | 6/1999 | ........ C10M/103/06 |
| EP | 1258513 | 11/2002 | ......... C09D/179/02 |
| GB | 2161569 | 1/1986 | .......... F16L/15/04 |
| WO | WO 00/66928 | 11/2000 | .......... F16L/15/00 |
| WO | WO 01/16516 | 3/2001 | .......... F16L/15/04 |
| WO | WO 02/18522 | 3/2002 | ........ C10M/169/00 |

OTHER PUBLICATIONS

Deberry, "Modification of the Electrochemical and Corrosion Behavior of Stainless Steels with an Electroactive Coating", Journal of the Electrochemical Society, 132(5), 1985, pp. 1022–1026.

(Continued)

Primary Examiner—Eric K. Nicholson
(74) Attorney, Agent, or Firm—Fitzpatrick, Cella, Harper & Scinto

(57) ABSTRACT

Described herein is a threaded joint, in which the threads are coated with a layer of dry lubricant having a thickness of between 5 μm and 30 μm and in which the nominal void volume NVV of the space (6, 7) between the thread of the male tube and the thread of the female tube, is sized by means of the following formulae:

$$NVV[\text{cm}^3] \le 4 \times OD[\text{inch}]$$

$$\frac{NVV[\text{cm}^3]}{OD[\text{inch}] \times \sqrt{Wt[\text{mm}]}} \le 1$$

$$g_T \le 0.4 \text{ mm}^2/\text{pitch}$$

where OD is the nominal outer diameter and Wt is the thickness of the wall of the pipes.

6 Claims, 3 Drawing Sheets

OTHER PUBLICATIONS

Gasparac et al., "Investigations of the Mechanism of Corrosion Inhibition by Polyaniline", Journal of the Electrochemical Society, 148(4), 2001, pp. B138–B145.

Wessling, B., "Scientific and Commercial Breakthrough for Organic Metals", Synthetic Metals 85(1997), pp. 1313–1318.

Lu et al., "Corrosion Protection of Mild Steel by Coatings Containing Polyaniline", Synthetic Metals, 71 (1995), pp. 2163–2166.

Camalet et al., "Electrodeposition of Protective Polyaniline Films on Mild Steel", Journal of Electroanalytical Chemistry, 416 (1996), pp. 179–182.

Rajagopalan et al., "Pretreatment and Coating of Low Carbon Steel Using Constant Potential Electrochemical Process", and "Corrosion Performance of Polyaniline–Polypyrrole Composite Coatings Applied to Low Carbon Steel", Surface Engineering 18(1), 2002, pp. 53–63.

Kraljic et al., "Inhibition of Steel Corrosion by Polyaniline Coatings", Corrosion Science 45 (2003), pp. 181–198.

Ponzio et al., "Removal of N–Methylpyrrolidone Hydrogen-bonded to Polyaniline Free–Standing Films by Protonation–Deprotonation Cycles or Thermal Heating", Polymer International 50 (2001) pp. 1180–1185.

Cao et al., "Influence of Chemical Polymerization Conditions on the Properties of Polyaniline", Polymer, vol. 30, (1989), pp. 2305–2311.

Stejskal et al., "In–Situ Polymerized Polyaniline Films", Synthetic Metals, 105 (1999), pp. 195–202.

Sun et al., "Chemical Polymerization of Aniline with Hydrogen Peroxide as Oxidant", Synthetic Metals 84 (1997), pp. 99–100.

Mattoso et al., "Controlled Synthesis of High Molecular Weight Polyaniline and Poly (O–Methoxyaniline)", Synthetic Metals, 68 (1994), pp. 1–11.

Singh et al., "Transport and Structural Properties of Polyaniline Doped with Monovalent and Multivalent Ions", Polymer, vol. 38, No. 19 (1997), pp. 4897–4902.

Genies et al., "Polyaniline: A Historical Survey", Synthetic Metals, 36 (1990), pp. 139–182.

Stejskal et al., "Polyaniline. Preparation of a Conducting Polymer", Pure Applied Chemistry, vol. 74, No. 5 (2002), pp. 857–867.

Yue et al., "Effect of Sulfonic Acid Group on Polyaniline Backbone", Journal of the American Chemical Society, 113 (1991), pp. 2665–2671.

Hwang et al., "Structures and Properties of the Soluble Polyanilines, N–Alkylated Emeraldine Bases", Synthetic Metals 92 (1998) pp. 39–46.

Salavagione et al., "Synthesis of a Self–Doped Polyaniline by Nucleophilic Addition", Acta Polym. 50 (1999), pp. 40–44.

* cited by examiner

THREADED JOINT FOR TUBES

BACKGROUND OF INVENTION

1. Field of the Invention

The present invention relates to a threaded joint for joining tubes used, in particular, in the natural-gas and oil extraction industry, which has the characteristics of claim 1. Said tubes can be used both as pipes for pumping gas or oil, and as casings of the drilling wells themselves.

2. Description of the State of the Art

In oilfields it is common practice to use metal pipes of a definite length, joined to form a string such as to reach the depth at which the reservoirs of gas or oil are found for extraction of the latter.

This extraction technique calls for the gradual internal coating of the well, in the course of drilling, using metal tubes, the so-called "casing". Once the desired depth has been reached, a string of metal tubes of smaller diameter, the so-called "tubing", is inserted in the "casing", for pumping the liquid or gas hydrocarbons to the surface. Both the column for the casing and the column for the tubing are made up of pipe segments assembled by means of threaded joints of a male and female type, so-called pin and box members.

To enable the operation of assembly it is common practice to use a lubricant to facilitate joining of the connectors. The lubricant normally used contains within it small particles of heavy metals, such as lead or copper. These heavy metals are dangerous for health and for the environment.

Apart from the risk of pollution, another problem that must be tackled is the determination of the quantity of lubricant, since performance of the joints is very sensitive to the variations of said quantity.

In general, galling occurs since an amount of lubricant less than the amount necessary does not ensure correct lubrication and does not enable the high contact pressure generated by the interference between the male and female threads to be sustained.

A problem opposite to the one described above is encountered in the use of dope and is the so-called "over-doping", or excess of dope, which entails the difficulty, during screwing of a joint, of disposing of the excess dope at the ends of the threads of the segments of tube. The entrapped dope can, as a result of this, develop high pressures in the joint. In particular circumstances, such pressures are able to produce a plastic deformation of the pipe segments in the threaded portion, and may lead to the collapse of the pin member. Once said phenomenon has occurred, the joint loses its effectiveness, and the pipe segments and/or the sleeve must be replaced.

Entrapping occurs when the dope does not have sufficient space for penetrating the interstices of the thread, or else if there is not sufficient space for it to flow on the outside of the connection.

The above problem is even more serious in the case of a joint with more than one seal. In this case, the lubricant is trapped between two seals, is not able to flow away, and it is impossible to reduce the high pressure that is developed.

A possible solution to the above problem is to provide, as reservoir for the lubricant, a void space obtained between the two seals.

The disadvantage resulting from providing a reservoir of lubricant consists in the creation of a considerable void space between the seals, which generates a loss of continuity and can thus reduce the performance of the joint.

Even if the lubricant is applied in a correct amount, the same problems referred to above may arise, mainly if there is a lack of uniformity of distribution over the entire area of the joint.

In this regard, it must be considered that the operation of application of the lubricant is carried out on the platform at the moment in which the string is lowered into the well and is consequently particularly expensive in terms of time and resources. The frequently adverse environmental conditions render both the precise dosage of the amount of lubricant and its application on the threaded parts problematical.

In order to reach the ever greater depths at which accumulations of hydrocarbons are found, the levels of performance required by the market are continuously increasing, as demonstrated by the increase in the thickness of the walls in use for oil extraction.

In order to deal with the above problems, there have been proposed solutions regarding the dosage and sizing of the spaces that are to be occupied by the lubricant.

A solution to the above problem of entrapment of lubricant has been proposed in the U.S. Pat. No. 4,830,411, which fixes the minimum extension of the void space between the male thread and the female thread. Said value is fixed at 0.6 $mm^2$/pitch. In said empty space the lubricant can expand and prevent the problems of imprisonment.

A further way of improving the performance of the joints, principally when the pipe works in compression, consists in reducing the gap between the acute side of the male and female threads, as disclosed in patent document WO 0066928, which suggests a value for said thread gap of 0.002 ins. (corresponding to 0.05 mm).

As a result of the above, considering, for example, a threaded joint with 6 TPI (threads per inch), with a height of each thread of 1 mm, the empty space above the male thread and the female thread, according to the teaching of U.S. Pat. No. 4,830,411, must be at least 0.26 mm in order to prevent problems of pressure of the lubricant. Thus the above total empty space represents a difference of diameter of 0.52 mm, between the outside of the male tube and the inside of the female tube.

The area of the critical section of a joint is the area of an annulus, and said area is different for the pin and for the box. For the pin said annulus is defined by the inner diameter (ID) of the pipe, on the one hand, and by the diameter at the groove of the last thread engaged, whilst for the box said annulus is defined by the outer diameter (OD) of the pipe and by the diameter at the groove of the last thread engaged.

Consequently, if we consider the quantities OD and ID of the tubes to be constant, said difference of 0.52 mm between the outside of the pin and the inside of the box can reduce the performance of the joint.

Furthermore, on account of the large gap on the stabbing sides of the thread, the threaded portion does not work when compressive loads are applied.

It emerges therefrom that preventing the problems of pressure of the lubricant and achieving high performance in the joint are requirements that go in opposite directions.

SUMMARY OF THE INVENTION

The main purpose of the present invention is to eliminate the disadvantages referred to above.

An object of the present invention is to provide a pipe joint in which dry lubricant is used.

An advantage obtained from the use of a dry lubricant applied on the parts co-operating in the joint at the end of the process of fabrication of the tubes is to prevent the need to carry out operations of lubrication during operation.

As a consequence of the fact that no space is required for containing excess lubricant, it is possible to optimize the geometry of the joint, the dimensions of the thread and the tolerances, reducing the empty spaces and consequently increasing the performance of the joint.

A further subject of the present invention is to optimize all the dimensions of the joint so as to reduce the total volume of the void space present therein.

A correct sizing of the optimal geometrical and dimensional characteristics of the thread and of the joint as a whole is defined by the formulae of $NVV[cm^3] \leq 4 \times OD[inch]$, where NVV is a nominal empty volume and OD is the nominal outer diameter of a tube expressed in inches.

According to the solution proposed with the joint of the present invention, the increase in the critical area of the joint may be greater than 3%.

DETAILED DESCRIPTION OF PREFERRED EMBODIMENTS OF THE INVENTION

Figure 1:
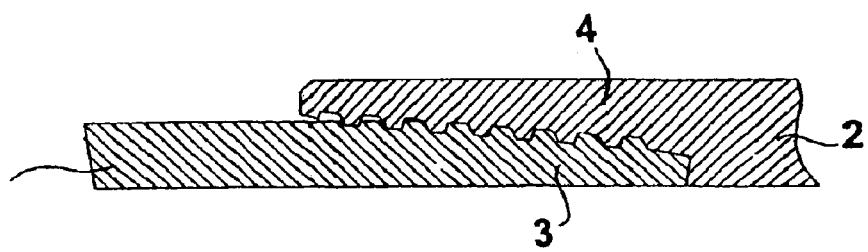
FIG. 1 illustrates a joint commonly used in the oil-extraction industry.

Illustrated in FIG. 1 is a joint comprising a male member or pin 1 with external thread 3 and a female member or box 2 with internal thread 4.

After accurate studies aimed at obtaining optimization in the sizing of the joints, it has proven possible to define mathematical relations between various parameters of the tubes.

We shall consider a thickness of coating of the dry lubricant of between 5 µm and 30 µm.

The area $g_T$ of the free space between the threads engaged in the section of the joint considered on an axial plane is less than 0.4 mm²/pitch.

$$g_T \leq 0.4 \text{ mm}^2/\text{pitch}$$

Figure 2:
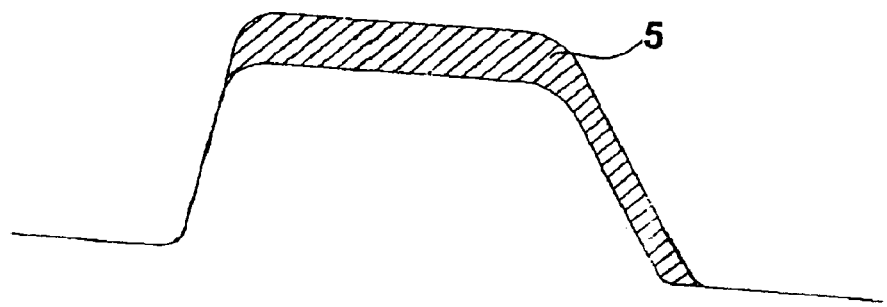
FIGS. 2, 3, 4 and 6 are enlarged illustrations of parts of the joint.
Figure 3:
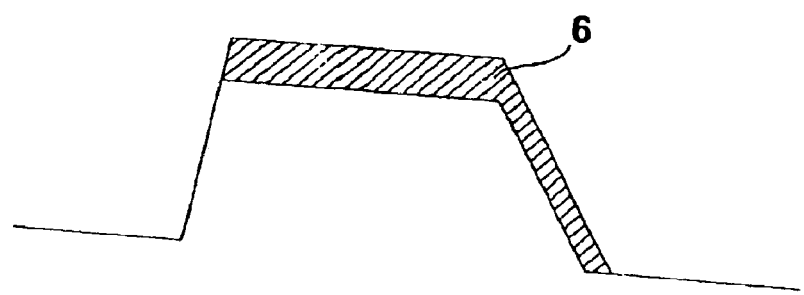

Said empty area $g_T$, designated by the reference number 5, is represented in FIG. 2. It may be calculated, for example, with the aid of a CAD, or else considering the area 6 in the idealized form, as represented in FIG. 3.

If we consider a thread with 4 TPI and a tooth height of 1.5 mm, the area filled by a coating of 30 µm of thickness is approximately 0.3 mm². Consequently, in order to prevent any unexpected contact between the sides of the threads, said maximum dimension of said area is fixed at 0.4 mm².

A second relation is defined between the nominal empty volume NVV and the nominal outer diameter OD of the tube expressed in inches, which is given by the following formula:

$$NVV[cm^3] \leq 4 \times OD[inch]$$

Defined as nominal empty volume is an index of the amount of empty space present within the joint.

The value of the parameter NVV must be calculated by evaluating the empty spaces between the two most distant seals.

The extension of said spaces must be calculated considering:
the effective space on the sides of the threads and between crests and roots when the two threads are mutually engaged in the nominal configuration. The calculation is made using the following formula:

$$G_T = g_T \times (PTL + ITL \times k) \times TPI$$

where $G_T$ is the total empty area in the thread [mm²]

PTL is the perfect-thread length [ins]

ITL is the imperfect-thread length [ins]

TPI is the number of threads per inch [ins⁻¹]

k is a constant which assumes that in the imperfect-thread length the empty spaces are greater than the empty spaces in the perfect thread on account of the crests of the threads that are cut. In the above-mentioned formula, the value of k is 5 and is calculated simulating the engagement of the threads in a portion of imperfect thread.

Figure 4:
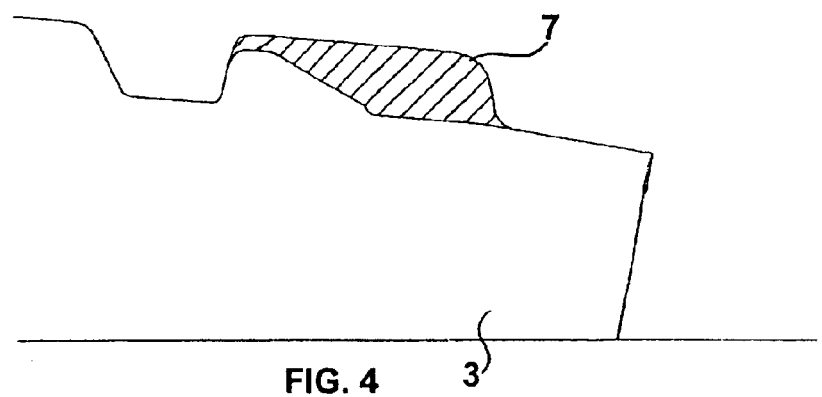

Other empty spaces $G_C$, designated by 7, of the joint, which are illustrated in FIG. 4, must be calculated when the male element and the female element are mated in the nominal configuration. In this case the nominal empty volume NVV is $$NVV = \pi (G_T[\text{mm}^2] + G_C[\text{mm}^2]) \times OD[\text{in}] \times 25.4 \left[ \frac{\text{mm}}{\text{in}} \right]$$

A third relation is defined between the nominal void volume NVV, the diameter OD, and the nominal thickness of the body of the tube Wt. Said nominal void volume (NVV), calculated as described previously, must be correlated to the following formula:

$$\frac{NVV[\text{cm}^3]}{OD[\text{inch}] \times \sqrt{Wt[\text{mm}]}} \leq 1$$

Wt appears under the square root since it must be considered that NVV represents the sum of a fixed volume (principally in the region of sealing and of imperfect thread) and of a linear value that increases with the perfect-thread length.

As a result, the increase in the empty volume due to the different length of thread on account of the different wall thickness, is better approximated by the square root chiefly because the empty volume for each individual pitch of thread is very small if compared to the total amount of empty space present in the joint.

The values of said parameters are represented in Table 1.

| Nom. Diameter. [ins] | Empty area [mm²] | Empty volume [cm³] | $\frac{NVV}{OD}$ | $\frac{NVV}{OD \times \sqrt{Wt}}$ |
|---|---|---|---|---|
| 7 3/4 | 59.9 | 37 | 4.8 | 1.24 |
| 10 3/4 | 57.4 | 49.2 | 4.58 | 1.3 |

Figure 5:
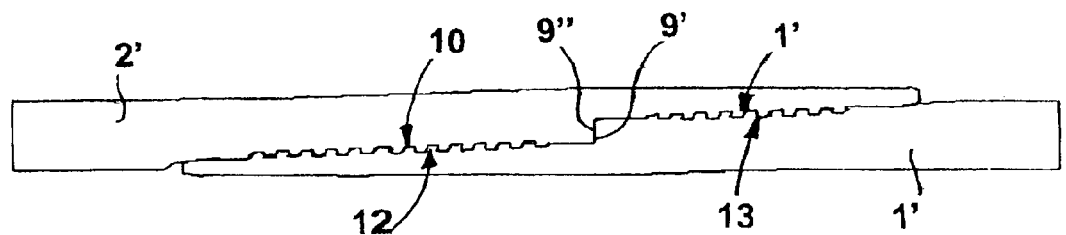
FIG. 5 shows a preferred embodiment of a near-flush joint with overall dimensions not much larger than the tube body.

A further preferred embodiment of the joint is represented in FIG. 5.

This illustrates a joint with a tapered thread in two stages, with central shoulder, devised in particular for use with dry lubricants.

Figure 6:
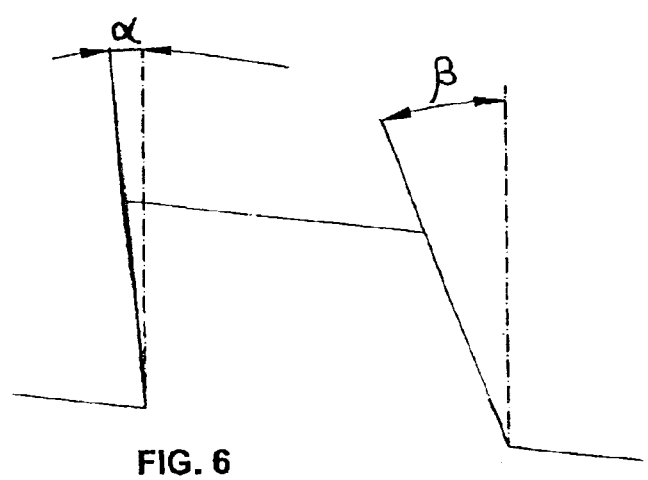

In said joint the two stages assume a value of tapering of 8.5% on the diameter, with a thread profile, as in FIG. 6, with an angle α of 4° and an angle β of 20°. According to said advantageous embodiment, the aforementioned parameters assume the following values:

| Nom. Diameter [Ins] | Empty area [mm²] | $g_T$ [mm²] | Empty Volume [cm³] | $\frac{NVV}{OD}$ | $\frac{NVV}{OD \times \sqrt{Wt}}$ |
|---|---|---|---|---|---|
| 7 ¾ | 43.1 | 0.28 | 26.6 | 3.43 | 0.88 |
| 10 ¾ | 38.4 | 0.28 | 33 | 3 | 0.83 |

Figure 7:
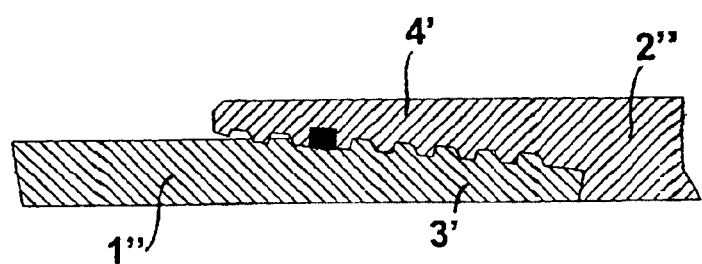
FIG. 7 shows a threaded and made up joint provided with a first metal-to-metal gasket and a seal ring in the terminal part of the threaded area.
Figure 8:
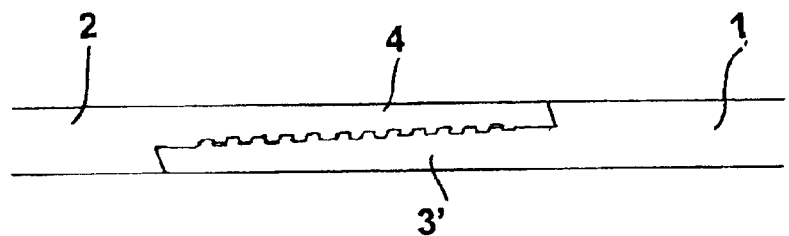
FIG. 8 illustrates an integral flush joint, i.e., with overall dimensions equal to those of the tube body.

Another preferred embodiment of the joint according to the invention is represented in FIG. 7. Said construction relates to a made up threaded joint, with single-stage tapered thread. It comprises a shoulder for abutment, set in a position corresponding to the nose of the male tube, a metal-to-metal seal and a ring-seal gasket located in the threaded area. The tapering of the thread is 6.25% in the case of 5 TPI and 8.5% in the case of 4 TPI. The profile of the thread is a modified saw-toothed one of the API type with an angle of the load side of 3° and an angle of the lead-in side of 25°.

We claim:

1. A threaded joint for pipes, comprising a pin (1, 1', 1") and a box (2, 2', 2"), each having, at at least one end, a respective threaded portion, in which said respective threaded portions are coated with a layer of dry lubricant having a thickness of between 5 μm and 30 μm and in which a nominal void volume (NVV) of a space (6, 7) between pin member and box member is sized so that the following formula is satisfied:

$$NVV[\text{cm}^3] \leq 4 \times OD[\text{inch}]$$

where OD is the nominal outer diameter of said pipes.

2. A threaded joint according to claim 1, wherein the nominal void volume NVV of the space (6, 7) is sized so that the following formula is satisfied:

$$\frac{NVV[\text{cm}^3]}{OD[\text{inch}] \times \sqrt{Wt[\text{mm}]}} \leq 1$$

where Wt is the thickness of the wall of said pipes.

3. A threaded joint according to claim 2, wherein the area $g_T$ of a free space (5, 6) between the threads engaged in the section of the joint considered on an axial plane is less than 0.4 mm²/pitch.

4. A threaded joint according to claim 1, wherein each of said male and female elements is provided with at least one seal element.

5. A threaded joint according to claim 4, wherein the pin has two outer threaded portions (12, 13) having a frusto-conical shape, which are axially staggered and separated by a shoulder (9'), and the box has two inner threaded portions (10, 11) having a frusto-conical shape, which are axially staggered and separated by a shoulder (9"), which acts as a detent during making up.

6. A threaded joint according to claim 4, wherein the pin has an outer threaded portion of frusto-conical shape and the box has an inner threaded portion having a frusto-conical shape, and each of the pin and box members is provided with a shoulder set at at least one respective end of the said threaded portions, adapted to act as abutment during making up.

* * * * *